Jan. 10, 1956 J. E. HAWKINS ET AL 2,730,187
SYSTEM AND METHOD OF GENERATING
SEISMIC WAVES IN THE EARTH
Original Filed Jan. 11, 1947 2 Sheets-Sheet 1
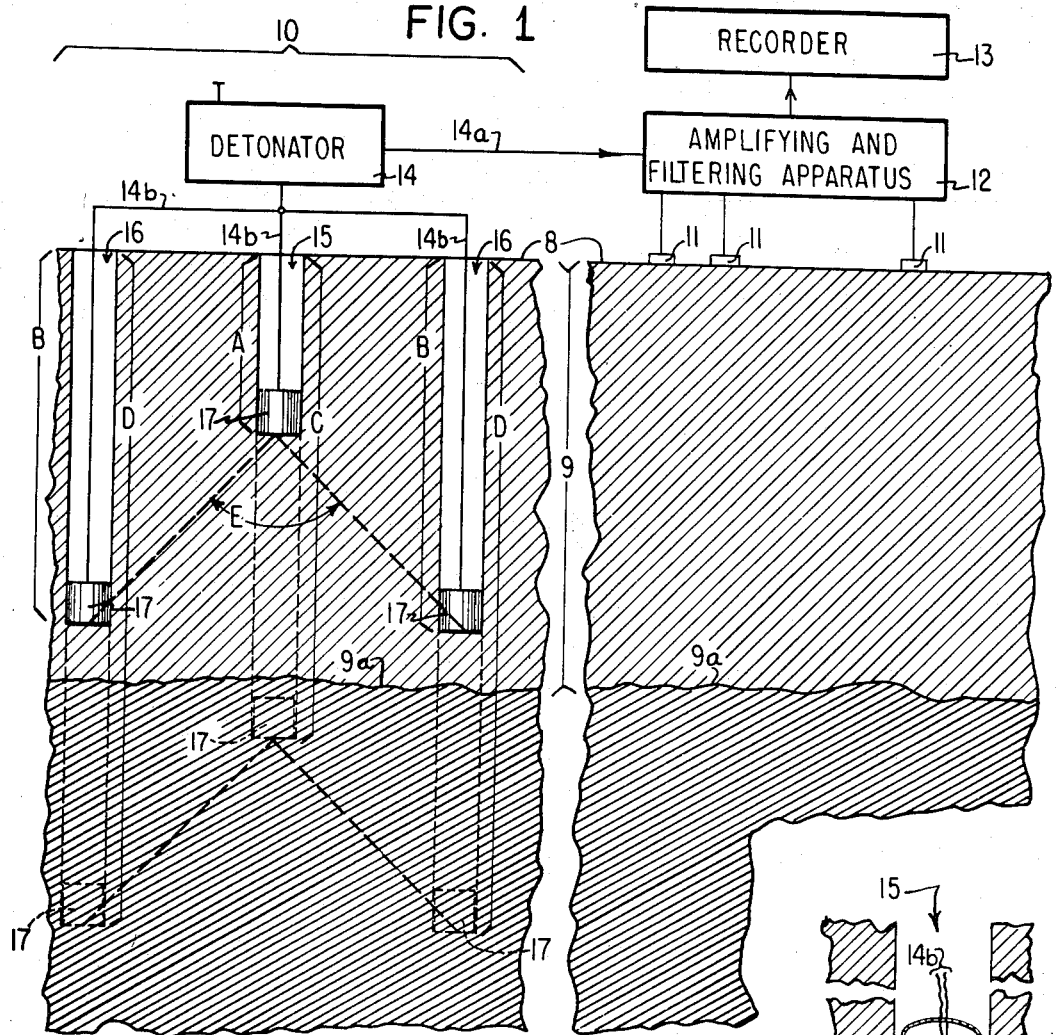
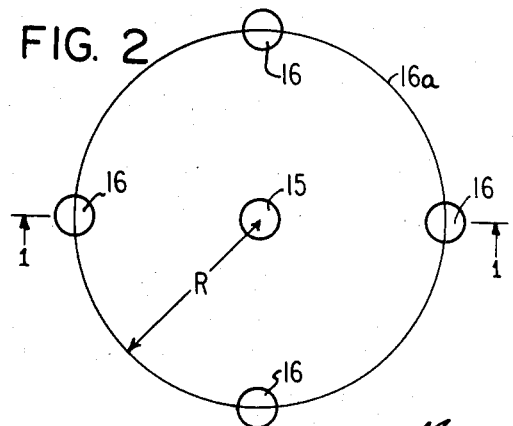
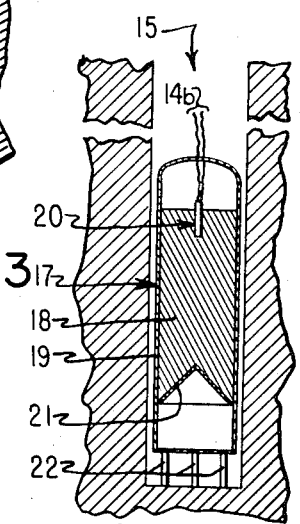
Inventors
James E. Hawkins
William E. Pugh
By Mason, Kolehmainen, Rathburn & Wyss
Attorneys

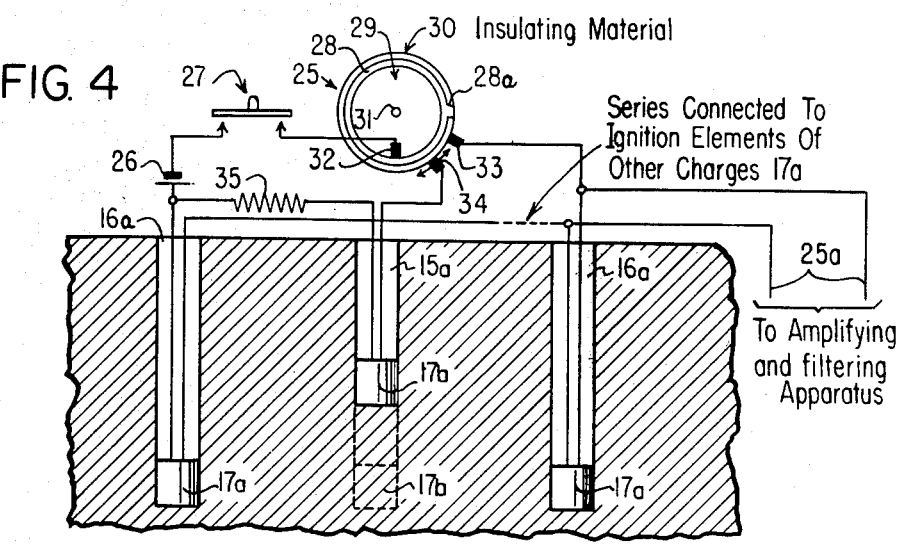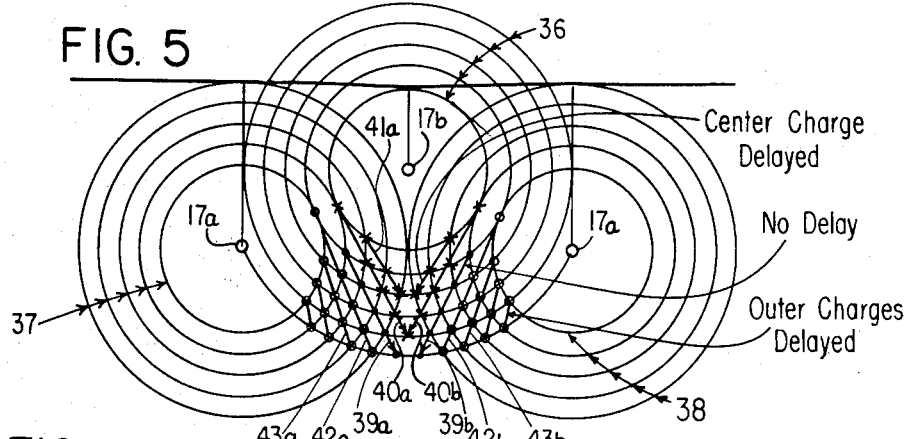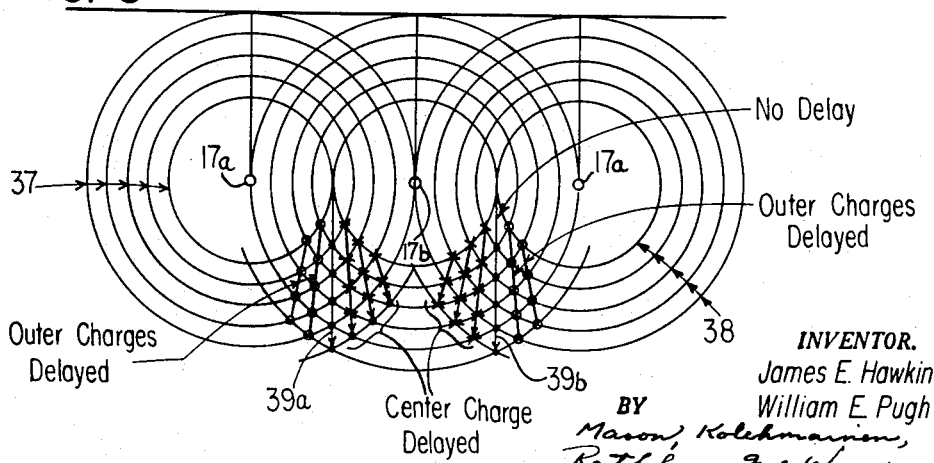

United States Patent Office 2,730,187
Patented Jan. 10, 1956

2,730,187

SYSTEM AND METHOD OF GENERATING SEISMIC WAVES IN THE EARTH

James E. Hawkins and William E. Pugh, Tulsa, Okla., assignors to Seismograph Service Corporation, Tulsa, Okla., a corporation of Delaware Original application January 11, 1947, Serial No. 721,558, now Patent No. 2,630,188, dated March 3, 1953. Divided and this application June 13, 1952, Serial No. 293,379

7 Claims. (Cl. 181—.5)

The present invention relates to the art of seismic prospecting and more particularly to an improved system and method of generating seismic waves in the earth. This application is a division of applicants' copending application Serial No. 721,558, filed January 11, 1947, now Patent No. 2,630,188, which is assigned to the same assignee as the present application.

Fundamentally, the art of seismic surveying is based upon the generation of sound or seismic waves in the earth's crust and detecting, recording and interpreting the waves which are reflected and refracted back to the earth's surface from buried strata interfaces and the like. Present practice in the generation of seismic waves is that of detonating dynamite or other explosives, as commercially obtained in package form, or as placed in a suitable container, metal or otherwise, to facilitate loading, in a shot hole usually drilled below the weathering or low velocity layer of the earth's crust. Detonation of the explosive charge below the weathering layer is usually necessary in order to avoid generating excessive amounts of undesired surface or near surface seismic wave energy which travels horizontally or nearly so to the points of wave detection. These undesired waves frequently have frequencies approximating the frequencies of the desired reflected and refracted waves and hence defy filtering prior to recording. They have the effect of so confusing or obscuring the records of the desired reflected waves as to render record interpretation difficult or impossible. In many areas, the interfering wave energy is of such large magnitude as compared with the magnitude of the reflected wave energy that successful reflection prospecting is either very difficult and expensive or impossible even when shot detonation below the weathering layer is resorted to to reduce the undesired wave energy. Moreover, even though this method of shooting is often successful in reducing the interfering wave energy to a tolerable value, it is somewhat expensive in that the shot holes must be drilled to considerable depths. In extremely unfavorable areas, undesirable energy cannot be eliminated even when the shot holes are drilled below the weathering and further, heavy and expensive explosive charges must be used in order to obtain reflected wave energy in sufficient magnitude to permit accurate interpretation of the resulting record.

It is an object of the present invention, therefore, to provide an improved system and method for so generating seismic waves in the earth that more effective utilization of explosives is obtained, thereby to conserve explosives and to eliminate the necessity of drilling shot holes through the weathering layer except in unusually difficult areas.

It is another object of the invention to provide a method and system of the character described in which the explosive force is directionalized in a downward direction, thereby to decrease the amount of undesired horizontal wave energy produced and to increase the amount of wave energy propagated downwardly toward the reflecting interfaces.

It is still another object of the invention to at least partially suppress certain undesired interfering (horizontal) waves of a selected and particularly objectionable frequency.

The invention, both as to its organization and method of operation, together with other objects and advantages thereof will best be understood by reference to the following specification taken in connection with the accompanying drawings in which:

Fig. 1 illustrates a seismic surveying system embodying a system of generating seismic waves characterized by the features of the present invention;

Fig. 2 illustrates the shot hole pattern of the seismic wave generating system embodied in the seismic surveying system shown in Fig. 1;

Fig. 3 is a view partially in section illustrating the details of one of the cavitated charges preferably used in each of the shot holes shown in Figs. 2 and 4;

Fig. 4 is a view similar to Fig. 1, but illustrating electrical equipment for detonation of the center charge and the outer charges at the same or different times; and Figs. 5 and 6 graphically illustrate the degrees of directionalization obtained when the center and outer charges are at the same and different levels in the earth's crust and are fired simultaneously and with delay times between the center and outer charges.

Referring now to the drawings and more particularly to Fig. 1 thereof, the present improved seismic signal generating system is there illustrated in its use in a seismic surveying system which comprises the usual amplifying and filtering apparatus 12 for transmitting detected signals from an array of geophones or signal detectors 11 in amplified form to the recording elements of a seismic signal recorder 13. The detectors 11 may be arranged in any desired array relative to and distant from the point 10 of seismic wave generation. As pointed out more fully below, detonation of the explosive charge or charges employed in the present improved wave generating system is effected under the control of a conventional electric impulse type detonator 14 which is electrically connected by means of a cable 14a with one of the signal translating channels of the apparatus 12 for the purpose of transmitting the "time-break" signal to one of the recording elements of the recorder 13. This detonator together with the signal detectors 11, the amplifying and filtering apparatus 12 and the recorder 13 may be of any desired commercial construction.

In general, the mode of operation of the system as thus far described will be readily understood by those skilled in the art. Briefly, however, seismic signals generated in the manner more fully pointed out below at the wave source or shot point 10 distant from the array of detectors 11, and as transmitted through the earth both directly and through reflection and refraction from buried strata interfaces and the like, are picked up by the detectors 11, converted into corresponding electrical signals through the operation of these detectors, amplified through the respective amplifying channels of the apparatus 12 and impressed upon the respective associated driving coils of the galvanometer elements embodied in the recorder 13 for recording. Also in accordance with conventional practice the time-break signal, as produced simultaneously with generation of the seismic waves, is transmitted over the cable 14a and through at least a part of one of the channels of the apparatus 12 to one of the recording elements of the recorder 13 for recording.

As pointed out above, the conventional method of generating seismic waves required in practicing the above described method of seismic surveying is that of drilling a shot hole through the weathering or low velocity layer 9 of the earth's crust, depositing an explosive charge usually in the form of packaged dynamite at the bottom of the shot hole and detonating the charge. This system of seismic wave generation is open to the several disadvantages briefly outlined above. In accordance with the present invention these disadvantages are at least in part obviated through use of the present improved seismic signal generating system to directionalize the seismic wave propagation and to at least in part suppress interfering wave energy. In one embodiment of the invention, these ends are accomplished by depositing a plurality of explosive charges 17 in a plurality of shot holes 15 and 16 to form an explosive charge pattern of approximately conical configuration which simulates a large cavitated charge and has the effect of producing "mass" directionalization of the generated seismic waves in the manner explained below with reference to Figs. 5 and 6 of the drawings when the explosive charges 17 are detonated. More specifically and as best shown in Fig. 2 of the drawings, the shot hole 15 is drilled at the center of a closed loop, preferably in the form of a circle 16a, and the shot holes 16 are drilled at equally spaced points around the circumference of this circle. In order to obtain the desired directionalization of the explosive energy, the center shot hole 15 is drilled to a depth A not greater than the depth B to which the surrounding shot holes 16 are drilled and usually less. For example, these depths are preferably so proportioned that the cone angle E is of the order of 90° if all of the charges 17 are to be simultaneously detonated. The detonating caps of the respective explosive charges 17 are commonly connected by means of two-conductor cables 14b to the current impulse generating circuit of the detonator 14 (which may be of the schematic form shown in Fig. 4 of the drawings) so that when this detonator is operated, the charges are exploded either simultaneously or in sequence.

As explained more fully below with reference to Figs. 5 and 6 of the drawings, with the explosive charges 17 arranged in a conical pattern to simulate a large cavitated charge, the well known "Munroe Effect" is obtained when these charges are either simultaneously detonated or detonated in a predetermined order. Specifically, the mass concavity of the shaped arrangement of explosive charges in the several shot holes in part causes the seismic energy to be directionalized in bulk in the sense that the wave energies produced at the individual shot holes are focused toward the central portion of the group pattern. In the arrangement illustrated, wherein the apex of the cone is nearest the earth's surface 8, the mass directionalization of the generated seismic energy is in a downward direction. Due to the described directionalization of the generated waves, the available explosive energy per unit of explosive material is much more effectively utilized for the reason that the increase in seismic energy propagation downward is realized at the expense of seismic energy propagation along horizontal or near-horizontal paths. As explained above, however, reduction in the horizontal seismic energy propagation is highly desirable since it is this energy which gives rise to interfering waves at the detectors 11 having the effect of obscuring or completely obliterating the reflecting and refracted waves which must be recorded to permit accurate interpretation of the attitude of the subsurface structure. Further, the increased effectiveness of each available unit of explosive material in producing wave propagation in a downward direction has the effect of further reducing the amount of explosive required to produce the desired amount of reflected and refracted energy. Thus while several charges are employed, the aggregate of the explosive material in the several charges may be appreciably less than that in a single charge of sufficient size to produce the same amount of seismic energy propagation in a downward direction. This further contributes to the desired reduction in undesired wave propagation in directions extending horizontally away from the shot holes.

A further advantage of the described system resides in the fact that shallower shot holes may be used to receive the explosive charges. Thus in the arrangement illustrated in full lines in Fig. 1 of the drawing the shot holes 15 and 16 are not drilled through the weathering layer 9. This is possible by virtue of the increased effectiveness of the explosive charges in producing seismic energy propagation in a downward direction and reducing the seismic energy propagation in the horizontal directions. In most areas where favorable conditions prevail, shot holes 15 and 16 drilled to very shallow depths in the weathering layer 9 should suffice to produce entirely acceptable records. However, in certain very difficult areas of deep weathering (exceeding one hundred feet, for example) and in areas where there is a relatively large amount of interference energy, it may be necessary to drill the holes 15 and 16 to depths C and D, respectively, extending below the bottom 9a of the layer 9. In such case, also, a differential between the depth C of the center hole 15 and the depth D of the surrounding holes 16 may be desired in order to realize the described "mass" concavity effect which results in directionalized propagation of the seismic energy in a downward direction when the charges in the several shot holes are detonated.

As indicated above, with the described system a reduction in the interfering or horizontally propagated energy is inherently obtained due to the directionalization of the generated seismic energy in a downward direction. In the usual case, the desired reflected and refracted waves fall within a restricted frequency range. This frequency range may vary from area to area depending upon the character of the surface and subsurface, but usually falls in a range of from 30 to 100 cycles per second. It is desirable, therefore, particularly in unfavorable areas where difficulty is experienced in obtaining appreciable wave reflection and refraction, to suppress or minimize the interfering horizontally propagated waves of the same frequency since, due to the frequency similarity of the desired and undesired energy, filtering within the apparatus 12 is not effective to separate the desired energy from the undesired energy.

In accordance with another feature of the present invention, suppression of undesired waves is obtained by so arranging and detonating the charges that the interfering waves produced by detonation of the outer charges are cancelled by waves of the same frequency produced by detonation of the center charge. If the charges are to be detonated simultaneously, this may be accomplished by making the radius of the circle 16 an odd multiple or submultiple of the wave length of the particular frequency at which the desired energy is to be received. For example, if test shots indicate that the interfering energy occurs at a frequency of twenty cycles per second and also that the velocity of wave propagation through the weathering or low velocity layer 9 is two thousand feet per second, the wave length of the twenty cycle energy obviously is one hundred feet. In such a case, by arranging the surrounding shot holes 16 symmetrically about the center of the shot hole 15 on a circle having a radius of fifty feet, the twenty cycle wave energy generated in the center shot hole 15 will be approximately 180° out of phase with the twenty cycle wave energy generated in the surrounding holes 16 in a horizontal plane, resulting in cancellation of a considerable amount of twenty cycle wave energy in directions extending laterally from the shot holes. As a further example, if the shot holes are drilled below the weathering or low velocity layer 9 in the manner illustrated in dash lines in Fig. 1 of the drawings and tests indicated that suppression of an interfering fifty cycle wave energy is desirable and that the velocity of wave propagation in the strata below the weathering layer 9 is eight thousand feet per second, waves of the frequency indicated will have a wave length of one hundred and sixty feet. Therefore, to obtain suppression of the interfering energy of this wave length in a horizontal direction, the outer shot holes 16 should be symmetrically spaced about the inner shot hole 15 on the circumference of a circle having a radius of eighty feet. Thus by a proper choice of the length of radius of the circle on which the outer shot holes 16 are located, propagation of undesired interfering wave energy may be further minimized.

As will be evident from the above explanation, partial suppression of undesired horizontal wave energy propagation is obtained when the one-half length wave length spacing of the outer charges 17 from the center charge 17 is used and the charges are simultaneously detonated. In accordance with still another feature of the present invention, suppression of undesired energy propagation laterally from the shot holes is also obtained by employing the detonating or firing system illustrated in Fig. 4 of the drawings to detonate the center charge 17b in the center shot hole 15a at a different time than the outer charges 17a in the shot holes 16a. In brief, the firing system shown in Fig. 4 of the drawings comprises a current source 26 for energizing the ignition elements of the charges 17a and 17b, an on-off switch 27 and a commutating device 25 for energizing the ignition element of the center charge 17b either before, after or at the same time as the outer charges 17a are energized. This commutating device is adapted to be driven about its axis of rotation 31 by means of any conventional constant speed motor and is comprised of a slip ring 28 having a commutating segment 28a interposed between insulating rings 29 and 30. The slip ring 28 projects radially beyond the ends of the rings 29 and 30 and the projecting end portion is constantly engaged at its inner periphery by a carbon brush 32. Two additional brushes 33 and 34 are provided which are spring urged to engage the periphery of the insulating ring 30 and to be successively engaged by the commutating segment 28a of the ring 28 during each revolution of the commutator assembly. With this construction and with the commutating device 25 in operation, circuits are successively completed for energizing the ignition element of the outer charges 17a and then the ignition element of the center charge 17b in response to closure of the switch 27. Thus, by observation of the commutating device (which travels at observable speed in a counterclockwise direction), the switch 27 may be closed while the commutating segment 28 is traveling away from the brush 34 and toward the brush 33. With this switch closed, a circuit including the brush 32, the commutating ring 28, the segment 28a and the brush 33, is first completed for energizing the ignition elements of the four outer charges 17a in series, thereby to effect simultaneous detonation of these charges, and simultaneously to transmit a time break signal over the circuit leads 25a to the distant amplifying and filtering apparatus. A predetermined time interval thereafter (this interval is determined by the speed of the commutating device 25 and the spacing between the brushes 33 and 34), the commutating segment 28a engages the brush 34 to energize the ignition elements of the charge 17b in series with the current limiting resistor 35 (which is equal in resistance to the combined resistance of three of the ignition elements) to effect detonation of the charge. The delay interval separating detonation of the center and outer charges is, of course, determined by the spacing between the brushes 33 and 34 and the speed of the commutating device, and for any given speed may be changed as desired by varying the spacing between the brushes 33 and 34. Preferably, therefore, the brush 34 is arranged for adjustment around the ring 30 to any desired position on either side of the brush 33 or to the same position as the latter brush, so that by appropriate adjustment of the brush 34, the center charge 17b may be detonated any desired determined time interval before or after detonation of the outer charge 17a or simultaneously with these charges.

Detonating the center and outer charges in sequence with varying degrees of delay between the detonation of center charge 17b and the simultaneous detonation of the outer charges 17a has the effect of changing the character of the directionalization of the explosive energy in a downward direction. Specifically and as best shown in Fig. 5 of the drawings, when any given charge is detonated, a wave front is generated which travels symmetrically outward in all directions away from the shot point at the same speed. In reference to the charge 17b, this wave front in travelling away from the charge is represented by a series of expanding circles 36. Two similar series of expanding circles 37 and 38 represent travel of the wave fronts away from the left and right shot points, respectively, when the charges 17a at these points are detonated.

It is the positions of the meeting points of the wave fronts produced through detonation of the center and outer charges relative to the locations of these charges which determine the degree of directionalization of the propagated energy. Thus with the center charge 17b disposed in the earth's crust at a lesser depth than the outer charges 17a, the wave fronts developed upon simultaneous detonation of the center and outer charges will meet at points between the center and outer charges and equidistant therefrom. In other words, the wave fronts of the center and outer charges meet at some point along each of the lines 39a and 39b which are the locus lines of the points of intersection of the wave front circles 36 individual to the center charge 17b with the wave front circles 37 and 38 of the same diameter individual to the left and right outer charges. The angle of convergence between the lines 39a and 39b thus may be used as an index of the degree of directionalization of the generated explosive energy in a downward direction.

Considering the circle diagram shown in Fig. 5 further, it will be understood that if detonation of the center charge 17b is delayed for an interval after the outer charges 17a are fired, the wave fronts traveling away from the outer shot points 17a will be further removed from their respective source points than the wave front traveling away from the center shot point 17b at the meeting points between the center and outer wave fronts. Thus for one delay interval, the wave fronts generated upon detonation of the outer charges 17a will meet the wave front generated upon detonation of the center charge 17b at corresponding points along the locus lines 40a and 40b. If a longer delay interval is used, wave front collision will occur at corresponding points along the locus lines 41a and 41b. On the other hand, if the center charge 17b is detonated ahead of the outer charge 17a, the wave front traveling away from the center shot point will be further removed from this point than the wave fronts traveling away from the respective outer shot points at the points of collision therebetween. Depending upon the magnitude of this delay interval, wave front meetings may occur at corresponding points along corresponding locus lines 42a—42b, 43a—43b, etc.

From the above explanation with reference to Fig. 5 of the drawings it will be clearly apparent that the degree of directionalization of explosive energy propagation in the desired downward direction may be changed as desired by changing the time relationship between the instant of detonation of the center charge 17b and the instant of detonation of the outer charges 17a. In general, best results are obtained when the center and outer charges are detonated to produce wave front meeting at the same points along loci lines having an angle of from 15° to 60° convergence. Another factor or parameter which determines the degree of directionalization of explosive energy propagation is the relative depth of the center and outer charges. This will be clearly evident from a consideration of Fig. 6 of the drawings wherein the center charge 17b is shown as being at the same depth as the outer charge 17a. From a comparison of the lines 39a and 39b representing the loci of the wave front meeting upon simultaneous detonation of the center and outer charges having the same depth as shown in Fig. 6 of the drawings with the corresponding lines 39a and 39b shown in Fig. 5 of the drawings to represent wave front meeting upon simultaneous detonation of the center and outer charges with the center charge 17b disposed at a lesser depth than the outer charges, it will be apparent that as the depth of the center charge is increased to approach that of the outer charges the angle of convergence between the lines 39a and 39b is substantially decreased. The same effect is observed from a comparison of the corresponding locus lines of Figs. 5 and 6 respectively, representing delayed center charge detonation and delayed outer charge detonation. It will thus be apparent that the relative depths of the center and outer charges is a second factor or parameter which may be varied to govern the degree of explosive energy directionalization which may be obtained upon detonation of the several charges. At appreciable distances away from the shot holes, this factor has no observable effect upon the cancellation of undesired waves in a horizontal direction, i. e., laterally of the shot holes.

As indicated above, however, the time relationship between the firing of the center charge and the several outer charges has a marked effect upon the suppression of undesired energy propagation in a horizontal direction away from the shot holes for the reason that this relationship determines the phase relationship between waves radiating from the several shot points following the initial impulse or transient wave. Thus if the waves radiating from the center shot hole 15a are in phase with the waves radiating from the outer shot holes 16a, undesired energy is additive. On the other hand and as explained above, if the waves radiating from the center hole 15a are out of phase with those radiating from outer shot holes 16a, the waves tend to cancel and energy suppression is obtained. This latter effect may be realized in the manner explained above by making the radius of the circle on which the outer shot holes 16a are located equal to one half the wave length of the waves representing the undesired energy. The desired out of phase relationship may also be obtained by properly delaying detonation of the center charge 17b for a predetermined interval after the outer charges 17a are detonated. In general, maximum undesired energy propagation in a horizontal direction is obtained when the following relationship prevails:

$$DT = \frac{\frac{1}{2}\lambda - R}{V}$$

where:

$DT$=the delay interval in milliseconds separating detonation of the outer charges 17a and later detonation of the center charge 17b;
$R$=radius of the circle on which the outer shot holes 16a are located;
$V$=velocity of wave propagation in the horizontal direction in feet per millisecond;
$\lambda$=wave length of the undesired wave energy.

From this relationship, it will be observed that any desired radius R of the circle on which the outer shot holes 16a are located may be used, providing an appropriate adjustment is made in the factor DT to produce suppression of undesired energy propagation in a horizontal direction.

To summarize, two variable factors or parameters, i. e., the factor DT and R govern undesired energy suppression. Further, the two factors DT and the relative depths of the center and outer explosive charges may be varied to obtain the desired degree of directionalization of explosive energy propagation in a downward direction. Permissible variations in these three parameters permit optimum results in the form of maximum suppression of undesired waves and maximum directionalization of the explosive energy in a downward direction to be obtained. Thus, assume that a vertical co-planar explosive charge arrangement of the form shown in Fig. 4 of the drawings is employed using only three charges. With the wave length of the undesired energy known from test data obtained in the manner explained above, the outer shot holes may be spaced apart a distance equal to one half the wave length of the undesired wave energy. When this spacing is used, maximum cancellation of undesired wave energy is obtained in the manner previously explained when these two outer charges are simultaneously detonated. With the center explosive charge 17b located midway between the two outer charges 17a, the delay time or factor DT necessary to produce undesired wave cancellation as between the center charge 17b and each of the outer charges 17a may be readily determined from the above equation and the brushes 33 and 34 of the commutating device 25 correspondingly adjusted to produce this delay interval. At this point, the necessary steps have been taken to produce maximum suppression of undesired wave energy propagation in a horizontal direction. There remains only the step of obtaining maximum directionalization in a downward direction of the explosive energy developed upon detonation of the charges. This is accomplished by appropriate selection of the only remaining unfixed parameter, i. e., the depth of the center charge 17b relative to the depth of the two outer charges 17a. This parameter may be determined on an experimental basis to produce maximum directionalization of the explosive energy downward.

Although the desired ends may be accomplished in the manner described above through the use of non-shaped explosive charges, they are materially enhanced by employing cavitated charges of the character illustrated in Fig. 3 of the drawings. As there shown, the explosive charge 17 is comprised of a body of explosive material 18, such, for example as Seismogel A, manufactured by E. I. du Pont de Nemours and Company, Inc., or the like, disposed within a closed container 19 and adapted to be detonated by means of a conventional cap 20 embedded in the top portion thereof. This cap includes the usual electrical ignition element adapted to be electrically connected to the detonator 14 by means of a pair of insulated conductors forming a cable 14b. At the bottom end thereof, the body of explosive material 18 is provided with a conical cavity 21 which may be formed through the use of a metallic conical shaped liner having its peripheral edge joined to the walls of the container 19 at a point removed from the lower end of this container. In order to enhance the directional explosive effect obtained through provision of the conical cavity in the lower end of the explosive body 18, the mouth of this cavity should be separated from the adjacent bottom of the shot hole by a predetermined stand-off distance. This is conveniently accomplished by extending the sides of the container 19 and by securing stand-off prongs 22 to the bottom wall of the container to project downwardly therefrom. These prongs may be forced into the bottom of the shot hole in order fixedly to position the charge 17 with its cavity 21 directed downwardly. In general, the stand-off distance will depend upon the diameter of the explosive body 18 and upon the angle of the conical concavity 21 in the lower end of this body. Experience indicates that for a 60° cone angle of the cavity 21, the optimum stand-off distance should be approximately one and one-half times the diameter of the body 18. As will be understood, if the enclosed explosive charges are to be used in shot holes containing loose or fluid material, at least the stand-off portion of the container should be sealed. In addition, if the closed stand-off portion of the container is sealed and evacuated, a greatly increased directional effect is obtained. The type of explosive used is not critical although best results have been obtained with those explosives which have the highest velocity of detonation and are reasonably plastic. The last mentioned characteristic is of importance, since the contact of the explosive with the concavity liner, if used, must be uniform over the entire area of contact between the explosive material and the liner in order to obtain best results.

As will be understood from the above explanation, when the shot hole arrangement illustrated in Fig. 4 is used, cavitated charges 17 of the specific form just described are disposed in the shot holes 15 and 16 with the prongs 22 of each charge extending into the bottom surface of the shot hole to insure maintenance of the charge in an upright or tilted position. After the charge is thus properly placed in the shot hole, the cable conductors 14b extending to the top of the shot hole are wired to the detonator in the manner illustrated in Fig. 4 of the drawings. When each charge is detonated, the explosive energy is substantially all directed in a downward direction due to the effect of the concavity provided at the lower end of the charge. Hence a relatively small amount of seismic energy of the interfering type is generated and propagated laterally from the shot hole. Moreover, due to the high degree of directionalization of the generated energy in the desired direction, only a small amount of explosive material is required to produce a large amount of seismic energy propagation in a downward direction. In fact, in certain areas where conditions of seismic wave propagation are highly favorable, the use of a single cavitated charge 17 of the character shown in Fig. 3 of the drawing and utilizing only a relatively small amount of explosive material may be found to produce entirely acceptable seismic records without resorting to use of the multi-shot systems illustrated in Figs. 1, 2 and 4 of the drawings. Depending upon conditions, the single cavitated charge 17 as used in such areas may be disposed in shot holes drilled through or only partially through the weathering layer 9. In any case, however, a marked saving in the amount of explosive material required is realized.

From the foregoing explanation it will be understood that the present invention represents a marked improvement in the art of seismic wave generation in that it permits a much more efficient use of explosives with an accompanying decrease in the amount of interfering energy produced. Also, material labor savings may be realized by virtue of the fact that shallower shot holes may be used without affecting the character of the seismic records obtained.

While different embodiments of the invention have been described, it will be understood that various modifications may be made thereon which are within the true spirit and scope of the invention as defined in the appended claims.

We claim:

1. A system for producing directional propagation of seismic waves through the earth, comprising a pair of spaced apart explosive charges disposed in the earth's crust at approximately the same depth, a third explosive charge disposed in the earth's crust at a depth not greater than the depth of said pair of charges and substantially equally spaced from said pair of charges, and means for simultaneously detonating said pair of charges and for detonating said third charge a predetermined time interval thereafter, thereby to directionalize the major portion of the explosive energy in a downward direction.

2. A system for producing directional propagation of seismic waves through the earth and for at least partially suppressing horizontal propagation of certain undesired waves of a predetermined frequency, comprising a pair of explosive charges disposed at approximately the same depth in the earth's crust and spaced apart a distance equal to substantially one-half the wave length of waves of said predetermined frequency, whereby waves of said predetermined frequency horizontally propagated from said charges upon simultaneous detonation thereof tend to cancel, a third charge laterally displaced from said pair of charges in the earth's crust at a point substantially equidistant from said pair of charges, and means for simultaneously detonating said pair of charges and for detonating said third charge a predetermined time interval thereafter to effect at least partial cancellation of the waves of said predetermined frequency horizontally propagated from said third charge by the waves of the same frequency horizontally propagated from each of said outer charges, the depth of said third charge being so related to the depths of said pair of charges that the major portion of the explosive energy developed upon detonation of said charges is directionalized in a downward direction when said third charge is detonated said predetermined interval after said pair of charges.

3. The method of generating seismic waves in the earth, which comprises positioning three charges substantially in alignment and in spaced relationship, detonating the two outer charges simultaneously, thereby to propagate explosive forces from the outer charge location points toward a common meeting zone, and detonating the center charge a predetermined time interval after detonation of said outer charges to propagate explosive forces from the center charge location point to said common meeting zone which interact with the forces arriving from said outer charges to produce resultant forces directionalized away from said common meeting zone and said center charges.

4. The method of generating seismic waves in the earth, which comprises positioning two explosive charges in spaced relationship a distance equal to an integer multiple of one half the wave length of undesired waves produced upon detonation of said charges, thereby to effect at least partial out-of-phase cancellation of said undesired waves, locating a third explosive charge between said charges in a position to directionalize into the earth the forces resulting from interaction of the explosive forces developed upon simultaneous detonation of said pair of charges and later detonation of said third charge, simultaneously detonating said pair of charges, and detonating said third charge a predetermined time interval after detonation of said pair of charges to effect at least partial out-of-phase cancellation of undesired wave energy developed upon detonation of said third charge with undesired wave energy developed upon detonation of said pair of charges.

5. The method of generating seismic waves in the earth and of at least partially suppressing horizontal propagation of certain undesired waves of a predetermined frequency, which comprises drilling a group of shot holes around the circumference of and at the center of a circle having a radius equal to substantially one half the wave length of the waves of said predetermined frequency, the depths of said holes being substantially equal, depositing explosive charges in said holes, simultaneously detonating the charges in the outer holes, and thereafter detonating the charge in the center hole, thereby to effect directionalization of the explosive energy produced by said charges in a downward direction.

6. The method of generating seismic waves in the earth and of at least partially suppressing horizontal propagation of certain undesired waves of a predetermined frequency, which comprises drilling a group of shot holes at spaced points around the periphery of a surface of revolution and at a point along the axis of said surface of revolution, said surface of revolution having a radius equal to substantially one half the wave length of the waves of said predetermined frequency at the velocity of propagation in the strata beneath the weathering layer of the earth, said holes all extending through the weathering layer and the depths of said holes being substantially equal, depositing explosive charges in said holes, simultaneously detonating the charges in the outer holes, and thereafter detonating the charge in the centerhole, thereby to effect directionalization of the explosive energy produced by said charges in a downward direction.

7. The method of generating seismic waves in the earth and of at least partially suppressing horizontal propagation of certain undesired waves of a predetermined frequency, which comprises drilling a group of shot holes around the circumference of and at the center of a circle having a radius equal to substantially one half the wave length of the waves of said predetermined frequency, the depths of said holes being substantially equal, depositing explosive cavitied explosive charges in said holes with the cavitied sides thereof facing downward, simultaneously detonating the charges in the outer holes, and thereafter detonating the charge in the center hole, thereby to effect directionalization of the explosive energy developed by said charges in a downward direction.

References Cited in the file of this patent

UNITED STATES PATENTS

| | | |
|---|---|---|
| 1,899,970 | McCollum | Mar. 7, 1933 |
| 2,239,123 | Stoneking | Apr. 22, 1941 |
| 2,340,314 | Farnham | Feb. 1, 1944 |
| 2,630,188 | Hawkins et al. | Mar. 3, 1953 |

FOREIGN PATENTS

| | | |
|---|---|---|
| 521,573 | Germany | Mar. 24, 1931 |